United States Patent [19]
Lin

[11] Patent Number: 5,966,507
[45] Date of Patent: Oct. 12, 1999

[54] IMAGE RESOLUTION ENHANCEMENT TECHNOLOGY (IRET) FOR DUAL DYE-LOAD INKJET PRINTER

[75] Inventor: Qian Lin, Santa Clara, Calif.

[73] Assignee: Hewlett-Packard Company, Palo Alto, Calif.

[21] Appl. No.: 08/921,891

[22] Filed: Aug. 25, 1997

[51] Int. Cl.$^6$ .................................................. H04N 1/40
[52] U.S. Cl. ........................................ 395/109; 358/298
[58] Field of Search .................. 395/109; 358/455–458, 358/518–520, 298, 534

[56] References Cited

U.S. PATENT DOCUMENTS

| | | | |
|---|---|---|---|
| 4,860,026 | 8/1989 | Matsumoto et al. | 358/298 |
| 4,924,301 | 5/1990 | Surbrook | 358/534 |
| 4,959,659 | 9/1990 | Sasaki et al. | 346/46 |
| 5,055,923 | 10/1991 | Kitagawa et al. | 358/534 |
| 5,111,302 | 5/1992 | Chan et al. | 358/298 |
| 5,317,418 | 5/1994 | Lin | 358/456 |
| 5,586,203 | 12/1996 | Spaulding | 382/270 |
| 5,615,021 | 3/1997 | Lin | 558/455 |

*Primary Examiner*—Thomas D. Lee
*Assistant Examiner*—Stephen Brinich

[57] ABSTRACT

A process and apparatus improve color halftone imaging for ink-based printing by reducing the amount of time necessary to perform the halftoning process, by reducing the amount of ink consumed and by increasing the quality of the images produced. These benefits are achieved by adapting Image Resolution Enhancement Technology (IRET) to render color images that achieve near-photographic image quality on a color inkjet printer having multiple dye load and increased scan axis addressability, while keeping the computation complexity to a minimum. This is achieved by designing basic patterns at multiple intensities, and by using a multi-level halftoning technique to obtain smooth gradations. For plain paper, as well as for coated paper, multi-level halftoning is performed on an asymmetric geometry to yield the best result, while for glossy paper, a regular geometry yields the best result because of the limited ink absorption capacity for glossy paper. Further benefits are achieved through non-primary color ink reduction and the use of assymetric dither matrices. Thus, the method and apparatus of the present invention will yield images that have few undesirable artifacts such as banding, texturing and "worms". Furthermore, a reduced amount of processing time will be required to render an image and a modest amount of ink will be used. Besides decreasing the cost of printing, the use of a lower amount of ink can cause decreased dry time for each print, and can reduce curling of the paper, and smudging of the image.

28 Claims, 3 Drawing Sheets

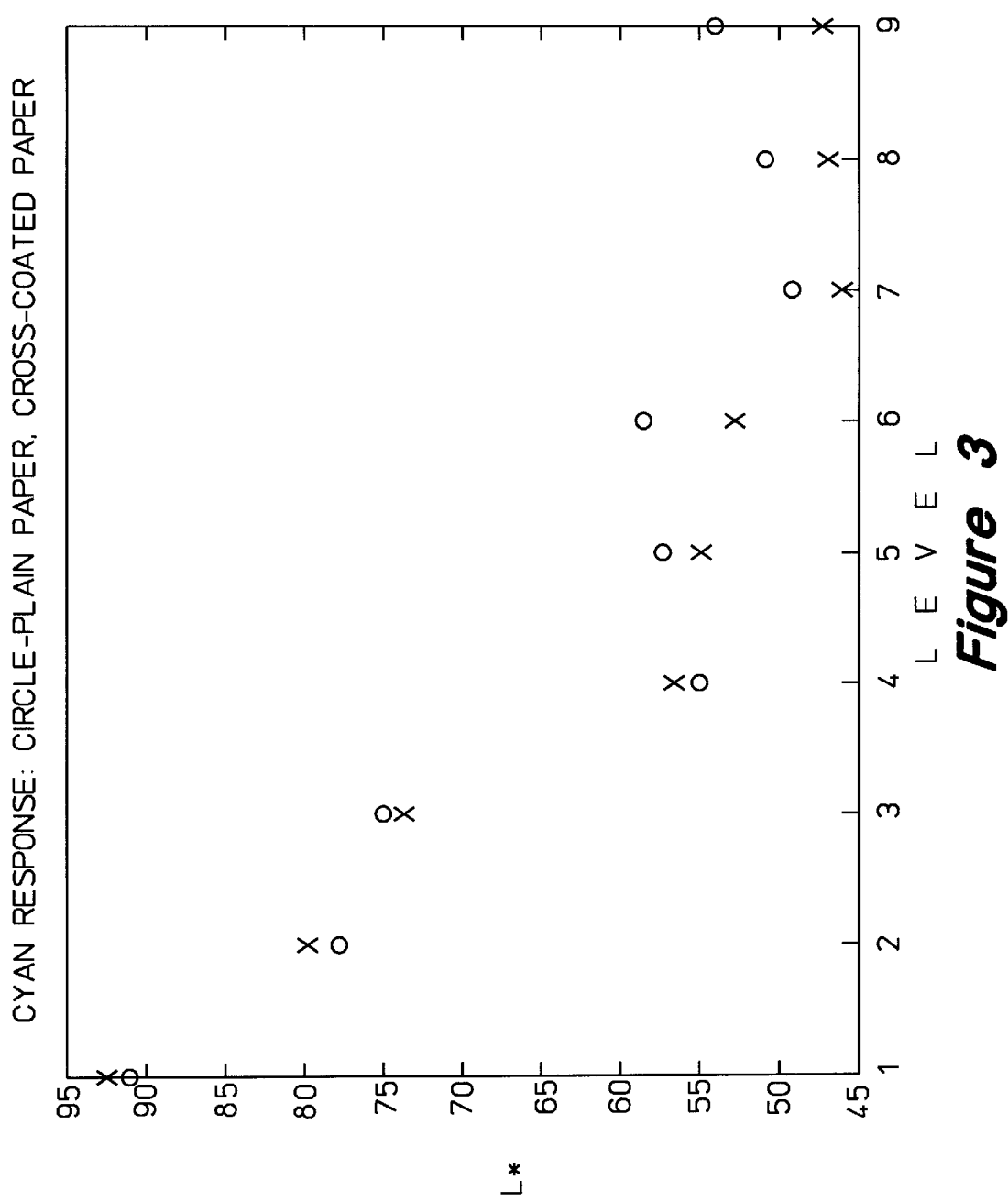

IMAGE RESOLUTION ENHANCEMENT TECHNOLOGY (IRET) FOR DUAL DYE-LOAD INKJET PRINTER

BACKGROUND OF THE INVENTION

1. Field of the Invention

The present invention relates to digital image processing and, more particularly, to processing color continuous-tone images into halftone images for ink-based printing.

2. Description of the Related Art

A color inkjet printer has the capability to render an image with color dots that are either bi-level or multi-level in intensity. Color dots of various intensities can be generated by using multiple chambers in print heads, each loading color inks with a different dye load. One example of such a printing system employs regular dye-load cyan, magenta, yellow, and black inks, and reduced dye-load cyan and magenta inks.

A printer can also achieve a higher scan axis printing resolution by increasing the firing frequency relative to the cartridge speed. Because the printer dot size remains the same, this is often referred to as the printer addressability. For example, a 300 dpi (dot per inch) printer can have the addressability of 600×300 dpi.

Image Resolution Enhancement Technology (IRET) includes two components: a multi-level halftoning algorithm, and basic pattern design. The multi-leveling halftoning algorithm is a general halftoning method, while the basic pattern design is more device specific. IRET has been successfully implemented in the Hewlett-Packard Color LaserJet laser printer. See, Q. Lin, Methods to Print N-Tone Images with Multi-leveling Techniques, U.S. patent application Ser. No. 08/205,672, filed Mar. 2, 1994, HP Docket 1093765-1; Q. Lin, Printing N-Tone Images with Imperceptible Dots, U.S. Pat. No. 5,615,021, issued Mar. 21, 1997, HP Docket 1094347-1; Q. Lin, B. Hoffmann, and J. Trask, Resolution Enhancement Procedure and Apparatus for a Color Laser Printer, U.S. patent application Ser. No. 08/788,767, filed Jan. 24, 1997, HP Docket 10960458-1.

It is desirable to develop a halftoning method for rendering a color image that achieves near-photographic image quality on a color inkjet printer having multiple dye loads and increased scan axis addressability. However, as will be discussed below in greater detail, one cannot readily extend the IRET to a dual-dye load inkjet printer. A standard application of IRET to a dual-dye load inkjet printer will yield images that have undesirable artifacts such as banding, texturing and "worms". Furthermore, a large amount of processing time will be required to render an image and an inordinate amount of ink will be used. Besides increasing the cost of printing, the use of excessive ink can cause additional undesirable effects such as an increased dry time for each print, curling of the paper, and smudging of the image.

Thus, it can be seen that physical properties of ink-based printing impose cost, output speed, and image fidelity limits upon ink-based color halftone image output devices, and hinder the use of these devices in many applications.

Therefore, there is an unresolved need for a technique that can improve color halftone imaging for ink-based printing by reducing the amount of time necessary to perform the halftoning process, by reducing the amount of ink consumed and by increasing the quality of the images produced.

SUMMARY OF THE INVENTION

A process and apparatus is described to improve color halftone imaging for ink-based printing by reducing the amount of time necessary to perform the halftoning process, by reducing the amount of ink consumed and by increasing the quality of the images produced. These benefits are achieved by adapting Image Resolution Enhancement Technology (IRET) to render color images that achieve near-photographic image quality on a color inkjet printer having multiple dye load and increased scan axis addressability.

We describe a method for rendering a color image on a dual dye-load inkjet printer with a near-photographic quality, while keeping the computation complexity to a minimum. This is achieved by designing basic patterns at multiple intensities, and by using a multi-level halftoning technique to obtain smooth gradations. For plain paper, as well as for coated paper, multi-level halftoning is performed on an asymmetric geometry to yield the best result, while for glossy paper, a regular geometry yields the best result because of the limited ink absorption capacity for glossy paper. Further benefits are achieved through non-primary color ink reduction and the use of assymetric dither matrices.

Thus, the method and apparatus of the present invention will yield images that have few undesirable artifacts such as banding, texturing and "worms". Furthermore, a reduced amount of processing time will be required to render an image and a modest amount of ink will be used. Besides decreasing the cost of printing, the use of a lower amount of ink can cause decreased dry time for each print, and can reduce curling of the paper, and smudging of the image.

BRIEF DESCRIPTION OF THE DRAWINGS

The invention will be readily understood by the following detailed description in conjunction with the accompanying drawings, wherein like reference numerals designate like structural elements, and in which:

FIG. 3 is a drawing illustrating representation of the lightness values for the basic patterns of dual-lye load cyan ink according to an embodiment of the present invention.

DETAILED DESCRIPTION OF THE INVENTION

Embodiments of the invention are discussed below with reference to FIGS. 1–3. Those skilled in the art will readily appreciate that the detailed description given herein with respect to these figures is for explanatory purposes, however, because the invention extends beyond these limited embodiments.

The following describes a halftoning method and apparatus for rendering a color image that achieves near-photographic image quality on a color inkjet printer having multiple dye load and increased scan axis addressability.

Image Resolution Enhancement Technology

Image Resolution Enhancement Technology (IRET) includes two components: a multi-level halftoning algorithm, and basic pattern design. The multi-leveling halftoning algorithm is a general halftoning method, while the basic pattern design is more device specific. As mentioned previously, IRET has been successfully implemented in the Hewlett-Packard Color LaserJet laser printer. This invention extends IRET to a dual-dye load inkjet printer. For continuity, we will review the multi-level halftoning algorithm in IRET, and then describe how to apply it to the dual dye-load inkjet printer that has increased scan axis addressability.

The multi-level halftone algorithm was developed to halftone any set of input numbers to any smaller set of output numbers. When there are several intensity levels to halftone into, it is possible to create a gray scale impression with dots at different intensity levels. This gives one more degree of freedom: not only can one select the arrangement of dots, but also which two dot intensities to use. It is preferable to select printer dots at two output gray levels closest to the input to perform spatial modulation. This will result in lowest pattern texture.

Figure 1:
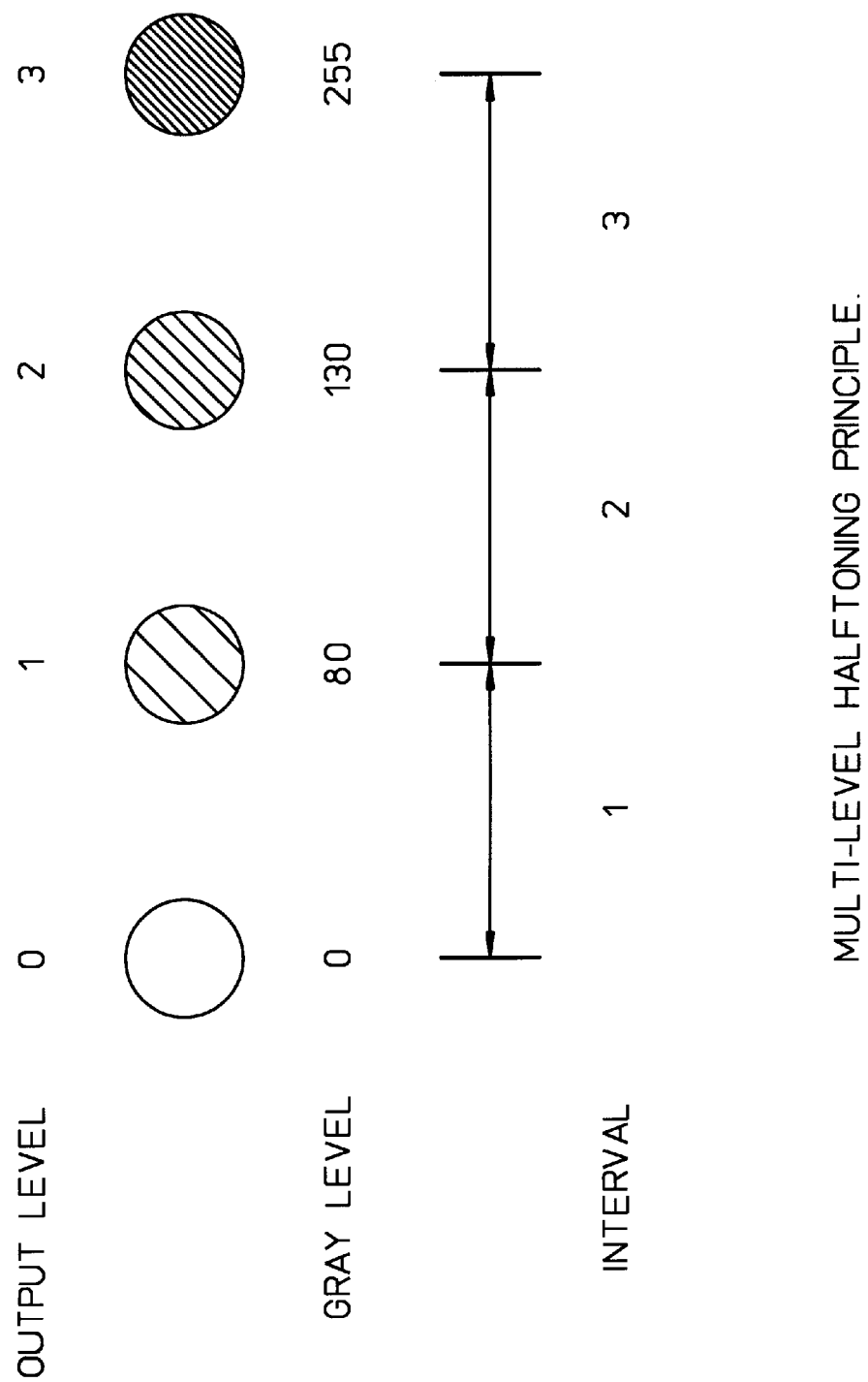
FIG. 1 is a drawing illustrating the Multi-level Halftoning Principle.

To illustrate this with an example, FIG. 1 is a drawing illustrating the Multi-level Halftoning Principle. Suppose we have 4 output levels with gray levels of 0, 80, 130, and 255, as shown in FIG. 1. Then any input data in the range of 0 to 80 belongs to interval 1, and will be halftoned using output levels 0 and 1. Similarly, any input data in the range of 81 to 130 belongs to interval 2, and will be halftoned using output levels 1 and 2. Finally, any input data in the range of 131 to 255 belongs to interval 3, and will be halftoned using output levels 2 and 3. For a gray patch with input gray level x that belongs in interval k, exactly how many pixels will take output level k and k+1 respectively, and how they will be distributed spatially, depends on the dither matrix employed.

To generate visually pleasing patterns, because the printing dots are typically large enough to be perceived as dots, the printing dots should be maximally dispersed when rendering a continuous tone image. Dispersing them will create a dot arrangement with the least perceptually detectable structure. One method of generating a halftone image with maximally dispersed dots is described in a U.S. patent. See, Q. Lin, Halftone Images Using Special Filters, U.S. Pat. No. 5,317,418, issued May 31, 1994, HP docket 1093443-1. For a color printer, it is further desirable for color dots to be maximally dispersed and to be dispersed with the least perceptually detectable changes in both hue and intensity. One method for generating such a halftone image is described in a US patent application. See, Q. Lin and J. P. Allebach, Joint Design of Dither Matrices for a Set of Colorants, U.S. patent application Ser. No. 08/641304, filed Apr. 30, 1996, HP Docket 10951098-1.

Similar reasoning also applies to a multi-level printer. Hence, it is desirable to use a set of matrices jointly designed for primary colors in conjunction with the multi-level halftoning algorithm.

In general, suppose there are K output levels 1, 2, . . . , K corresponding to non-uniformly spaced gray levels $N_1$, $N_2$, . . . , $N_K$, with $N_1 < N_2 < \ldots N_K$, and the input gray scale range is from $N_1$ to $N_K$. Then according to this scheme, any input gray patch with gray level between $N_K$ and $N_{K+1}$ will be rendered using printer dots at intensity levels $N_K$ and $N_{K+1}$.

To render input x(m, n) at pixel position (m, n), the corresponding element t(m, n) in a halftone matrix is scaled to the region $[N_K, N_{K+1}]$, and compared with x(m, n). Let $t'_k(m, n)$ be the scaled-down matrix:

$$t'_k(m, n) = t_k(m, n) \times \frac{N_{K+1} - N_K}{N_K - N_1},$$

then the output y(m, n) at pixel position (m, n) is $$y(m, n) = \begin{cases} k+1 & \text{if } t'_k(m, n) + N_K < x < N_{K+1} \\ k & \text{if } N_k < x <= t'_k(m, n) + N_K \end{cases}$$

Figure 2:
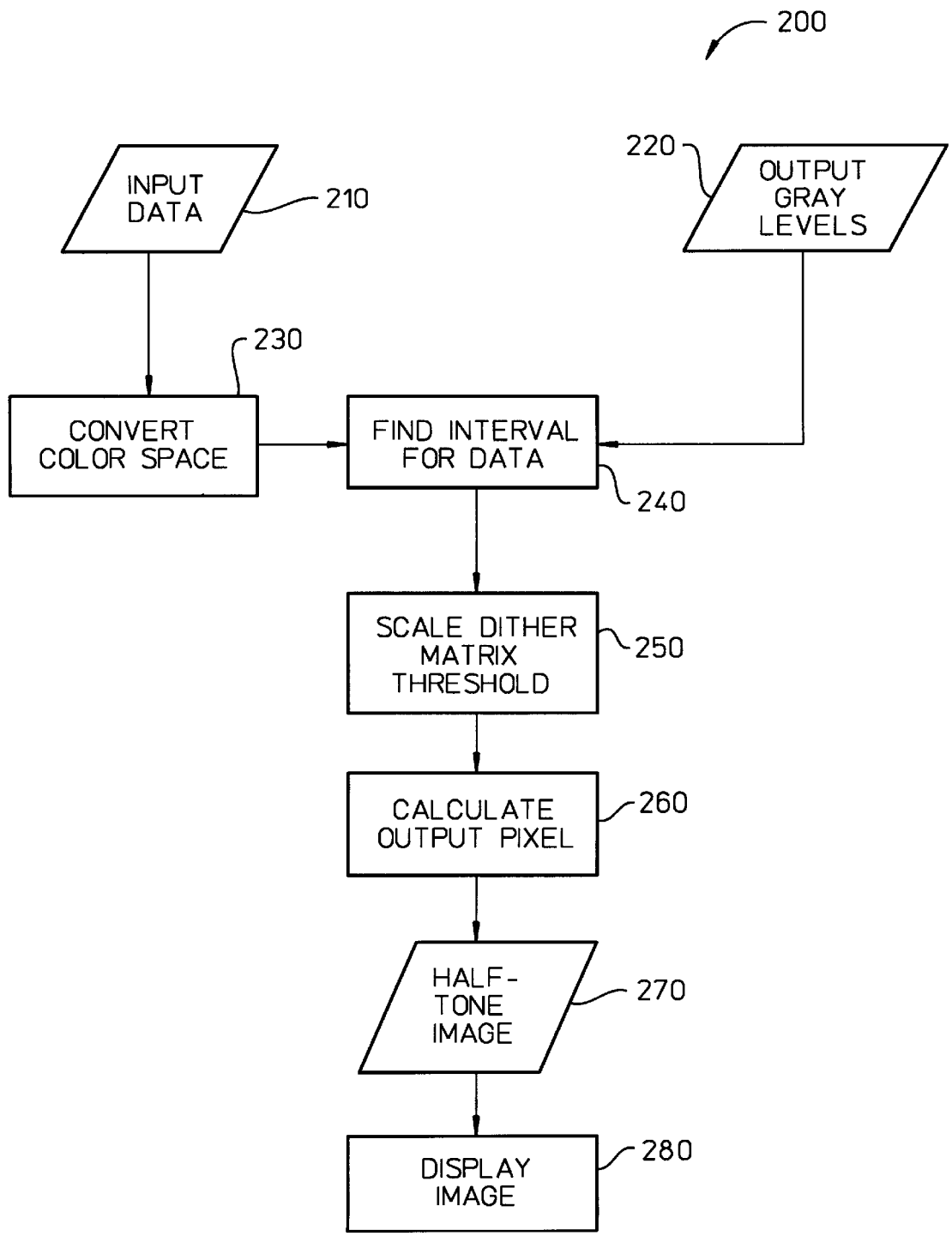
FIG. 2 is a drawing illustrating an Image Resolution Enhancement Technology color halftoning technique modified according to the present invention to a accommodate the special needs of a color inkjet printer having multiple dye load and increased scan axis addressability.

FIG. 2 is a drawing illustrating an Image Resolution Enhancement Technology color halftoning technique 200 modified according to the present invention to accommodate the special needs of a color inkjet printer that has multiple dye loads and increased scan axis addressability.

To perform multi-level halftoning using the basic algorithm, we can first compare the input data (210) with the output gray levels (220) to determine (240) the interval into which the data falls, and then store it in a look-up table $lut_1$. This would require 256 bytes. We can also store the result of scaling a dither matrix threshold (250) for each interval in a second look-up table $lut_2$. This would require 256K bytes, where K is the total number of output levels. In addition, one can also store the M×M dither matrix, which requires M×M bytes.

For example, if we have 16 output levels, and we use a 16×16 dither matrix, then the total amount of ROM needed is 4.6k bytes.

Let x(m, n) be the input pixel, and t(m, n) be the dither matrix threshold at the current pixel (m, n), then the output pixel y(m, n) is obtained (260) using $$k = lut_1[x(m, n)]$$

$$y(m, n) = \begin{cases} k+1 & \text{if } x(m, n) > +lut_2[k][t(m, n)] \\ k & \text{else} \end{cases}$$

The computation required per pixel is then 2 table look-ups, 1 comparison, and 0 to 1 addition. The resulting halftone image (270) can then be printed or displayed (280).

Applying IRET to Dual Dye-Load Inkjet Printer

Halftoning for a dual dye-load printer can be achieved by converting the problem into a multi-level halftoning problem. Because the dual dye-load printing system has four primary colors, cyan, magenta, yellow and black, one preferably first to converts (230) RGB to CMYK. The cyan and magenta color can then be rendered using the regular dye-load ink and the reduced dye-load ink, depending on the cyan and magenta levels, respectively. For example, light tone regions will be rendered using the low dye-load ink, while midtone regions will be rendered with a mixture of reduced dye-load ink and regular dye-load ink, with the amount of regular dye-load ink increasing toward the dark tone regions. Moreover, we have complete control over the placement of the dots to minimize overlap, thus reducing halftone texture. For example, after we achieve 100% coverage of the low dye-load ink, we gradually replace low dye-load dots with regular dye-load dots, while maintaining 100% ink coverage.

Utilizing the increased scan axis addressability in conjunction with the dual dye-load inks, it is possible to achieve near photographic image quality on a low cost inkjet printer. Two embodiments, will be discussed next.

First embodiment: using 300×600 geometry to obtain more levels

We can use the increased scan axis resolution to obtain more levels. Using the 300×600 dpi mode, it is possible to get a maximum of 8 basic output levels for cyan and magenta, not including white, on the 300×300 dpi grid. These are 1L, 2L, 1D, 1D1L, 1D2L, 2D, 2D1L, 2D2L, where 1D stands for one dark drop, 1L stands for 1 light drop, and so on. FIG. 3 is a representation of the lightness (L*) values for the basic patterns of cyan ink according to an embodiment of the present invention. However, as shown in FIG. 3, which plots the L* for the basic output levels of cyan, 2D1L, 2D2L are actually lighter than 2D on both the plain paper and the coated paper. Levels 1D and 1D1L have similar darkness as 1D2L, but much worse banding. So, for one embodiment only 4 levels were selected for cyan and magenta: 1L, 2L, 1D2L, and 2D.

The halftoning strategies mentioned above that worked very well on plain paper and coated paper resulted in too much ink on glossy paper. After some experimentation, we found that using only 1 light drop (1L) or 1 dark drop (1D) for cyan and magenta (tri-level), and 1 drop of yellow (bi-level) on the 300×300 dpi grid gives good results.

It is important to realize that by selecting the appropriate basic patterns, it is possible to achieve ink limiting, so that ink can be absorbed by the paper without problems. To have more flexible and accurate control, we can, in addition, perform a color decomposition, and calculate the amount of primary colors, secondary colors, and tertiary colors, and limit the maximum amount of each color to the appropriate amount. As an example, secondary colors, such as blue, may need more reduction.

For example, suppose the red, green, and blue components of a pixel are 30, 50, 40. Then the cyan, magenta, and yellow amounts will be 255−30=225, 255−50=205, and 255−40=215, respectively. The amount of tertiary color is min (225, 205, 215)=205. The amount of secondary color (green) is med (225, 205, 215)−min (225, 205, 215)=215−205=10. The amount of primary color (magenta) is max (225, 205, 215)−min (225, 205, 215)=225−205=10. We can reduce each of the tertiary, secondary and primary colors by a different percentage. For example, we can reduce the amount of tertiary color by 20% to 205×0.8=164, we can reduce the amount of secondary color (green) by 10% to 10×0.9=9, and make no adjustment to the primary color cyan. After these ink limiting computations the final cyan amount is 164+9+10=183, the final magenta amount is 164, and the final yellow amount is 164+9=173.

Second Embodiment: asymmetric halftoning on 300×600 geometry

In the first embodiment, halftoning was performed on the 300×300 dpi grid. The 300×600 dpi mode is used, but dots are combined to form more levels on the 300×300 dpi grid. This is similar to the IRET approach for the Color LaserJet laser printer. See, Q. Lin, B. Hoffmann, and J. Trask, U.S. patent application Ser. No. 08/788,767, filed Jan. 24, 1997, HP Docket 10960458. Alternatively, halftoning can be performed on the 300×600 dpi grid, resulting in tri-level halftoning on cyan and magenta (white, 1 light drop, 1 dark drop), and bi-level halftoning on yellow and black.

There are two advantages associated with using asymmetric halftoning. First, there is less banding. Super-pixeling is more susceptible to banding in some regions, for example, in the lighter neutral tone region. Secondly, the texture in asymmetric halftoning is more consistent. For example, there is no change in texture in the transition area between 1 light drop and 2 light drops in the cyan and magenta ramps.

When performing asymmetric halftoning on the 300×600 dpi grid, a dither matrix designed for regular printing geometry will be compressed in one direction, resulting in "worm" like patterns in the highlight region. The effect is subtle but noticeable. This problem can be solved by designing a set of dither matrices for the 300×600 dpi geometry. For stochastic dither matrices such as those described in Lin and Allebach, U.S. patent application Ser. No. 08/641,304, filed Apr. 30, 1996, HP Docket 10951098-1, supra, and in Q. Lin, U.S. Pat. No. 5,317,418, issued May 31, 1994, HP docket 1093443-1, supra, the widths of the filters in the matrix design are adjusted to compensate for the space compression in the paper advance direction. For example, the filter width in the scan direction, where the addressability is higher (600 dpi), can be set as twice the filter width in the paper advance direction.

Observe that on a ramp from white to full magenta, the density of low dye-load magenta dots gradually increases, until 100% coverage is attained. Then the low dye-load dots are gradually replaced by the high dye-load dots while the ink coverage remains at 100%. This ensures that the visibility of halftone texture is minimal, and coalescence of ink drops is also minimal.

In asymmetric halftoning, the source image is kept at 300×300 dpi while the output bitmap is 600×300 dpi. Let x(m, n) be the input pixel, and t(m, n) be the dither matrix threshold at the current pixel (m, n), then the output pixel y(m, n) is obtained using $$k = lut_1[x(m, n)]$$

$$y(2m, n) = \begin{cases} k+1 & \text{if } x(m, n) > lut_2[k][t(2m, n)] \\ k & \text{else} \end{cases}$$

$$y(2m+1, n) = \begin{cases} k+1 & \text{if } x(m, n) > lut_2[k][t(2m+1, n)] \\ k & \text{else} \end{cases}$$

Note that it is also possible to scale the source image to 300×600 dpi resolution. However, because the dot size is still at 300 dpi, the extra computation may not be warranted.

Conclusions

We described a method for rendering a color image on a dual dye-load inkjet printer with a near-photographic quality, while keeping the computation complexity to a minimum. This is achieved by designing basic patterns at multiple intensities, and by using a multi-level halftoning technique to obtain smooth gradations. For plain paper, as well as for coated paper, multi-level halftoning is performed on an asymmetric geometry to yield the best result, while for glossy paper, a regular geometry yields the best result because of the limited ink absorption capacity for glossy paper.

The many features and advantages of the invention are apparent from the written description and thus it is intended by the appended claims to cover all such features and advantages of the invention. Further, because numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A process for halftoning a color continuous tone image to form a halftone image, the process comprising the steps of:

for at least one color, extracting the color information for the selected color from the color continuous tone image; and performing a multi-level halftoning for the selected color wherein the multiple levels are chosen such that when printing a tone ramp for the selected color, light tone regions are rendered using a low dye-load ink, while midtone regions are rendered with a mixture of the low dye-load ink and a regular dye-load ink, with the regular dye-load ink amount increasing toward dark tone regions, wherein the multiple levels are chosen based upon characteristics of a target print medium.

2. The process as set forth in claim 1, wherein a first set of the multiple levels is used if the target print medium is plain paper and a second set of the multiple levels is used if the target print medium is glossy paper.

3. The process as set forth in claim 1, wherein a first set of the multiple levels is used if the target print medium is coated paper and a second set of the multiple levels is used if the target print medium is glossy paper.

4. A process for halftoning a color continuous tone image to form a halftone image, the process comprising the steps of:

for at least one color, extracting the color information for the selected color from the color continuous tone image; and performing a multi-level halftoning for the selected color wherein the multiple levels are chosen such that when printing a tone ramp for the selected color, light tone regions are rendered using a low dye-load ink, while midtone regions are rendered with a mixture of the low dye-load ink and a regular dye-load ink, with the regular dye-load ink amount increasing toward dark tone regions, wherein the multi-level halftoning is performed on an asymmetric geometry.

5. The process as set forth in claim 4, wherein the multi-level halftoning is performed on the asymmetric geometry to account for different adressability in scan and medium advance directions.

6. A process for halftoning a color continuous tone image to form a halftone image, the process comprising the steps of:

for at least one color, extracting the color information for the selected color from the color continuous tone image; and performing a multi-level halftoning for the selected color wherein the multiple levels are chosen such that when printing a tone ramp for the selected color, light tone regions are rendered using a low dye-load ink, while midtone regions are rendered with a mixture of the low dye-load ink and a regular dye-load ink, with the regular dye-load ink amount increasing toward dark tone regions, wherein the multi-level halftoning is performed on a symmetric geometry.

7. A process for halftoning a color continuous tone image to form a halftone image, the process comprising the steps of:

for at least one color, extracting the color information for the selected color from the color continuous tone image; and performing a multi-level halftoning for the selected color wherein the multiple levels are chosen such that when printing a tone ramp for the selected color, light tone regions are rendered using a low dye-load ink, while midtone regions are rendered with a mixture of the low dye-load ink and a regular dye-load ink, with the regular dye-load ink amount increasing toward dark tone regions, wherein the multi-level halftoning is performed on an asymmetric geometry for a first target print medium and the multi-level halftoning is performed on a symmetric geometry for a second target print medium.

8. The process as set forth in claim 7, wherein the multi-level halftoning is performed on the asymmetric geometry if the first target print medium is plain paper and the multi-level halftoning is performed on the symmetric geometry if the second target print medium is glossy paper.

9. The process as set forth in claim 7, wherein the multi-level halftoning is performed on the asymmetric geometry if the first target print medium is coated paper and the multi-level halftoning is performed on the symmetric geometry if the second target print medium is glossy paper.

10. A process for halftoning a color continuous tone image to form a halftone image, the process comprising the steps of:

for at least one color, exacting the color information for the selected color from the color continuous tone image; and performing a multi-level halftoning for the selected color wherein the multiple levels are chosen such that when printing a tone ramp for the selected color, light tone regions are rendered using a low dye-load ink, while midtone regions are rendered with a mixture of the low dye-load ink and a regular dye-load ink, with the regular dye-load ink amount increasing toward dark tone regions, wherein the multi-level halftoning is performed using an asymmetric dither matrix.

11. The process as set forth in claim 10, wherein the multi-level halftoning is performed using the asymmetric dither matrix to account for different adressability in scan and medium advance directions.

12. The process as set forth in claim 10, wherein the multi-level halftoning is performed using the asymmetric dither matrix, and wherein the dither matrix is designed with an asymmetric filter to account for different adressability in scan and medium advance directions.

13. A process for halftoning a color continuous tone image to form a halftone image, the process comprising the steps of:

for at least one color, extracting the color information for the selected color from the color continuous tone image; and performing a multi-level halftoning for the selected color wherein the multiple levels are chosen such that when printing a tone ramp for the selected color, light tone regions are rendered using a low dye-load ink, while midtone regions are rendered with a mixture of the low dye-load ink and a regular dye-load ink, with the regular dye-load ink amount increasing toward dark tone regions, wherein the multi-level halftoning is performed using a symmetric dither matrix.

14. A process for halftoning a color continuous tone image to form a halftone image, the process comprising the steps of:

for at least one color, extracting the color information for the selected color from the color continuous tone image; and performing a multi-level halftoning for the selected color wherein the multiple levels are chosen such that when printing a tone ramp for the selected color, light tone regions are rendered using a low dye-load ink, while midtone regions are rendered with a mixture of the low dye-load ink and a regular dye-load ink, with the regular dye-load ink amount increasing toward dark tone regions; and further comprising the steps of:

performing a color decomposition into primary and non-primary colors; and limiting the maximum amount of primary and non-primary colors to achieve ink limiting.

15. A processor for halftoning a color continuous tone image to form a halftone image, the processor comprising:

for at least one color, means for extracting the color information for the selected color from the color continuous tone image; and means for performing a multi-level halftoning for the selected color wherein the multiple levels are chosen such that when printing a tone ramp for the selected color, light tone regions are rendered using a low dye-load ink, while midtone regions are rendered with a mixture of the low dye-load ink and a regular dye-load ink, with the regular dye-load ink amount increasing toward dark tone regions, wherein the multiple levels are chosen based upon characteristics of a target print medium.

16. The processor as set forth in claim 15, wherein a first set of the multiple levels is used if the target print medium is plain paper and a second set of the multiple levels is used if the target print medium is glossy paper.

17. The processor as set forth in claim 15, wherein a first set of the multiple levels is used if the target print medium is coated paper and a second set of the multiple levels is used if the target print medium is glossy paper.

18. A processor for halftoning a color continuous tone image to form a halftone image, the processor comprising:

for at least one color, means for extracting the color information for the selected color from the color continuous tone image; and means for performing a multi-level halftoning for the selected color wherein the multiple levels are chosen such that when printing a tone ramp for the selected color, light tone regions are rendered using a low dye-load ink, while midtone regions are rendered with a mixture of the low dye-load ink and a regular dye-load ink, with the regular dye-load ink amount increasing toward dark tone regions, wherein the multi-level halftoning is performed on an asymmetric geometry.

19. The processor as set forth in claim 18, wherein the multi-level halftoning is performed on the asymmetric geometry to account for different adressability in scan and medium advance directions.

20. A processor for halftoning a color continuous tone image to form a halftone image, the processor comprising:

for at least one color, means for extracting the color information for the selected color from the color continuous tone image; and means for performing a multi-level halftoning for the selected color wherein the multiple levels are chosen such that when printing a tone ramp for the selected color, light tone regions are rendered using a low dye-load ink, while midtone regions are rendered with a mixture of the low dye-load ink and a regular dye-load ink, with the regular dye-load ink amount increasing toward dark tone regions, wherein the multi-level halftoning is performed on a symmetric geometry.

21. A processor for halftoning a color continuous tone image to form a halftone image, the processor comprising:

for at least one color, means for extracting the color information for the selected color from the color continuous tone image; and means for performing a multi-level halftoning for the selected color wherein the multiple levels are chosen such that when printing a tone ramp for the selected color, light tone regions are rendered using a low dye-load ink, while midtone regions are rendered with a mixture of the low dye-load ink and a regular dye-load ink, with the regular dye-load ink amount increasing toward dark tone regions, wherein the multi-level halftoning is performed on an asymmetric geometry for a first target print medium and the multi-level halftoning is performed on a symmetric geometry for a second target print medium.

22. The processor as set forth in claim 21, wherein the multi-level halftoning is performed on the asymmetric geometry if the first target print medium is plain paper and the multi-level halftoning is performed on the symmetric geometry if the second target print medium is glossy paper.

23. The processor as set forth in claim 21, wherein the multi-level halftoning is performed on the asymmetric geometry if the first target print medium is coated paper and the multi-level halftoning is performed on the symmetric geometry if the second target print medium is glossy paper.

24. A processor for halftoning a color continuous tone image to form a halftone image, the processor comprising:

for at least one color, means for extracting the color information for the selected color from the color continuous tone image; and means for performing a multi-level halftoning for the selected color wherein the multiple levels are chosen such that when printing a tone ramp for the selected color, light tone regions are rendered using a low dye-load ink, while midtone regions are rendered with a mixture of the low dye-load ink and a regular dye-load ink, with the regular dye-load ink amount increasing toward dark tone regions, wherein the multi-level halftoning is performed using an asymmetric dither matrix.

25. The processor as set forth in claim 24, wherein the multi-level halftoning is performed using the asymmetric dither matrix to account for different adressability in scan and medium advance directions.

26. The processor as set forth in claim 24, wherein the multi-level halftoning is performed using the asymmetric dither matrix, and wherein the dither matrix is designed with an asymmetric filter to account for different adressability in scan and medium advance directions.

27. A processor for halftoning a color continuous tone image to form a halftone image, the processor comprising:

for at least one color, means for extracting the color information for the selected color from the color continuous tone image; and means for performing a multi-level halftoning for the selected color wherein the multiple levels are chosen such that when printing a tone ramp for the selected color, light tone regions are rendered using a low dye-load ink, while midtone regions are rendered with a mixture of the low dye-load ink and a regular dye-load ink, with the regular dye-load ink amount increasing toward dark tone regions, wherein the multi-level halftoning is performed using a symmetric dither matrix.

28. A processor for halftoning a color continuous tone image to form a halftone image, the processor comprising:

for at least one color, means for extracting the color information for the selected color from the color continuous tone image; and means for performing a multi-level halftoning for the selected color wherein the multiple levels are chosen such that when printing a tone ramp for the selected color, light tone regions are rendered using a low dye-load ink, while midtone regions are rendered with a mixture of the low dye-load ink and a regular dye-load ink, with the regular dye-load ink amount increasing toward dark tone regions; and further, comprising:

means for performing a color decomposition into primary and non-primary colors; and means for limiting the maximum amount of primary and non-primary colors to achieve ink limiting.

* * * * *